(12) United States Patent
Lim

(10) Patent No.: US 6,822,968 B1
(45) Date of Patent: Nov. 23, 2004

(54) METHOD AND APPARATUS FOR ACCOUNTING FOR DELAYS CAUSED BY LOGIC IN A NETWORK INTERFACE BY INTEGRATING LOGIC INTO A MEDIA ACCESS CONTROLLER

(75) Inventor: Alvin Swee Hock Lim, Toa Payoh (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/536,724

(22) Filed: Mar. 28, 2000

Related U.S. Application Data

(60) Provisional application No. 60/173,487, filed on Dec. 29, 1999.

(51) Int. Cl.[7] ............................................. H04L 12/56
(52) U.S. Cl. ...................... 370/419; 370/428; 370/466; 710/58
(58) Field of Search .................................. 370/419, 420, 370/428, 429, 466, 471; 710/58, 60

(56) References Cited

U.S. PATENT DOCUMENTS

| | | | | |
|---|---|---|---|---|
| 5,058,114 A | * | 10/1991 | Kuboki et al. ................. | 714/38 |
| 5,245,617 A | * | 9/1993 | DeSouza et al. ............ | 714/766 |
| 5,436,902 A | * | 7/1995 | McNamara et al. ........ | 370/447 |
| 5,815,501 A | * | 9/1998 | Gaddis et al. .............. | 370/402 |
| 6,047,001 A | * | 4/2000 | Kuo et al. ................... | 370/428 |
| 6,272,551 B1 | * | 8/2001 | Martin et al. ................ | 709/250 |
| 6,279,044 B1 | * | 8/2001 | Niu et al. ....................... | 710/5 |
| 6,584,109 B1 | * | 6/2003 | Feuerstraeter et al. ...... | 370/401 |

* cited by examiner

*Primary Examiner*—Hassan Kizou
*Assistant Examiner*—D Levitan

(57) ABSTRACT

A method and apparatus for reducing link latency caused by logic in a network interface. A media access controller having a converter, modification logic, a FIFO and a controller reduces the link latency caused when the logic modifies a data packet. The converter receives frame data from a transmit buffer and converts the frame data into a data packet having a prescribed format for transmission onto a network. The logic modifies the data packet. The FIFO buffers the data packet using a plurality of flip-flops. The controller controls the flow of the data packet and determines when to transmit the data packet onto a network via a media access controller.

26 Claims, 7 Drawing Sheets

METHOD AND APPARATUS FOR ACCOUNTING FOR DELAYS CAUSED BY LOGIC IN A NETWORK INTERFACE BY INTEGRATING LOGIC INTO A MEDIA ACCESS CONTROLLER

RELATED APPLICATIONS

This application claims priority from U.S. Provisional Application Ser. No. 60/173,487, filed Dec. 29, 1999, which is incorporated herein by reference.

TECHNICAL FIELD

The present invention relates to reducing delays caused by logic in a network interface, more particularly to an arrangement in which, logic for modifying a data packet is incorporated into a media access controller in a network interface device thereby allowing the media access controller to account for the delays caused by the logic.

BACKGROUND ART

Local area networks use network cables or other network media to link different nodes (e.g., computers, workstations, and servers) across a common network. Local area networks allow different nodes to access other nodes having common peripheral devices (e.g. printers, servers, and modems). Each local area network architecture uses a media access controller (MAC) enabling a network interface device (NID) at each network node to share access to the network media. In order to control the operation of the network, the network operates under some form of a standard or protocol, such as an Ethernet protocol.

Traditional Ethernet networks (10BASE-T) operate at 10 Mb/s Ethernet protocol, as described by IEEE Standard 802.3; the majority of Ethernet interfaces currently operate at this data rate. However, a newer Ethernet standard, under IEEE standard 802.3u, accomplishes the faster operation of 100 BASE-T systems, at a 100 Mb/s data rate (i.e., a 125 Mb/s encoded bit rate) using unshielded twisted pair (UTP) physical media. The 100 BASE-T standard defines operation over two pairs of category 5 UTP (100 BASE-TX) and over four pairs of category 3 UTP. The 100 BASE-FX network medium, covered by the 100 BASE-T standard, allows operation over dual fiber optic cabling.

In order to transfer information between nodes in a local area network, a media access controller transmits data packets onto a network via a media independent interface. Typically, the data packets are not modified between the media access controller and the media independent interface. However, in some network systems, external logic is placed between the media access controller and the media independent interface to provide modifying of data packets. Reasons for modifying a data packet include incorporating cyclic redundancy check digits with the data packet, encrypting the data packet, appending routing information to the data packet, and other modifications to the data packet. When the external logic modifies a data packet, the media access controller cannot compensate or account for any link latency or delays caused by the external logic.

FIG. 1 is an example of a network interface 10 having logic 12 between the media access controller 14 and the media independent interface 16 according to the prior art. Frame data is supplied from a transmit buffer 18 to the media access controller 14. The media access controller 14 converts the frame data into a converted data packet in accordance with a prescribed network protocol. The converted data packet passes through the external logic 12, which can modify the converted data packet. Since the external logic 12 receives the converted data packet, the media access controller 14 is unaware of any modifications that affect the converted data packet. Therefore, the media access controller 14 cannot account for any delays that may occur as a result of the external logic 12 modifying a data packet. Failure to account for delays can cause communication problems.

For example, if a network is designed according to a prescribed transmission scheme where each node (i.e., media access controller) in the network is given a strict window in which to transmit, then any delay the external logic causes disrupts the entire scheme. As an example, if each node in the network transmits using a round robin scheme where a first node transmits during a given window, then a second node transmits during a given window, and so on, then any delays in a node's transmission can effect the entire network.

Another concern is that network systems that include a plurality of nodes operating under Ethernet IEEE 802.3 half-duplex protocol may end up losing access to the media channel between contending network nodes due to delay created by the external logic 12.

As a result, in order to deter additional delays, media access controllers need to be able to account for delays. By placing logic between a media access controller and the media independent interface, the media access controller cannot compensate for any delays caused by the logic without adding complexity to the network interface.

DISCLOSURE OF THE INVENTION

There is a need for an arrangement enabling a media access controller in a network interface to account for link latency or delays caused by logic in the network interface.

There is a need for an arrangement enabling a media access controller in a network interface device to account for link latency or delays caused by logic modifying a data packet without adding complexity to the network interface device.

There is also a need for an arrangement enabling a media access controller in a network interface device to account for link latency or delays caused by logic modifying a data packet prior to transmission of the data packet.

There is also a need for an arrangement enabling logic in a media access controller to modify a data packet by appending cyclic redundancy check digits onto the data packet and the media access controller accounting for link latency or delays caused by the logic modifying the data packet.

There is also a need for an arrangement enabling logic in a media access controller to modify a data packet by encrypting the data packet and the media access controller accounting for link latency or delays caused by the logic modifying the data packet.

There is also a need for an arrangement enabling logic in a media access controller to modify a data packet by adding routing information to the data packet, with the media access controller accounting for link latency or delays caused by the logic modifying the data packet.

There is also a need for an arrangement enabling a media access controller in a network interface device to reduce link latency or delays caused by excessive buffering of a data packet by the flip-flops associated with the logic and first in first out (FIFO) buffer in the media access controller.

These and other needs are attained by the present invention where a network interface device is configured for accounting for link latency or delays caused by logic modifying frame data. In addition, the size of the media access controller can be reduced since the flip-flops in the FIFO can be used to buffer the data, thereby reducing the number of flip-flops the logic requires for buffering the data.

According to one aspect of the present invention a network interface is provided comprising a converter configured for receiving frame data from a transmit buffer and converting the frame data into a data packet having a prescribed format for transmission onto a network, logic configured for modifying at least a portion of the data packet, and a first in first out (FIFO) memory configured for buffering the data packet using a plurality of flip-flops. Integrating the logic into the media access controller allows the media access controller to account for any delays or link latency that the logic causes by modifying the frame data. Similarly, placing the converter behind the FIFO rather than in front of the logic allows the media access controller to account for any delays or link latency.

According to another aspect of the present invention a method for a media access controller, comprising, receiving a frame data from a transmit buffer, converting the frame data into a data packet having a prescribed format for transmission, modifying at least a portion of the data packet using logic and buffering the data packet. Integrating the logic into the media access controller allows the media access controller to control the transmission, including the timing of the transmission, of the converted data packet onto the attached network. Similarly, the steps of the above described reference can occur in a different ordering thereby allowing the media access controller to control the transmission and timing of the transmission of the converted data packet onto a network.

Additional advantages and novel features of the invention will be set forth in part in the description which follows, and in part will become apparent to those skilled in the art upon examination of the following or may be learned by practice of the invention.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
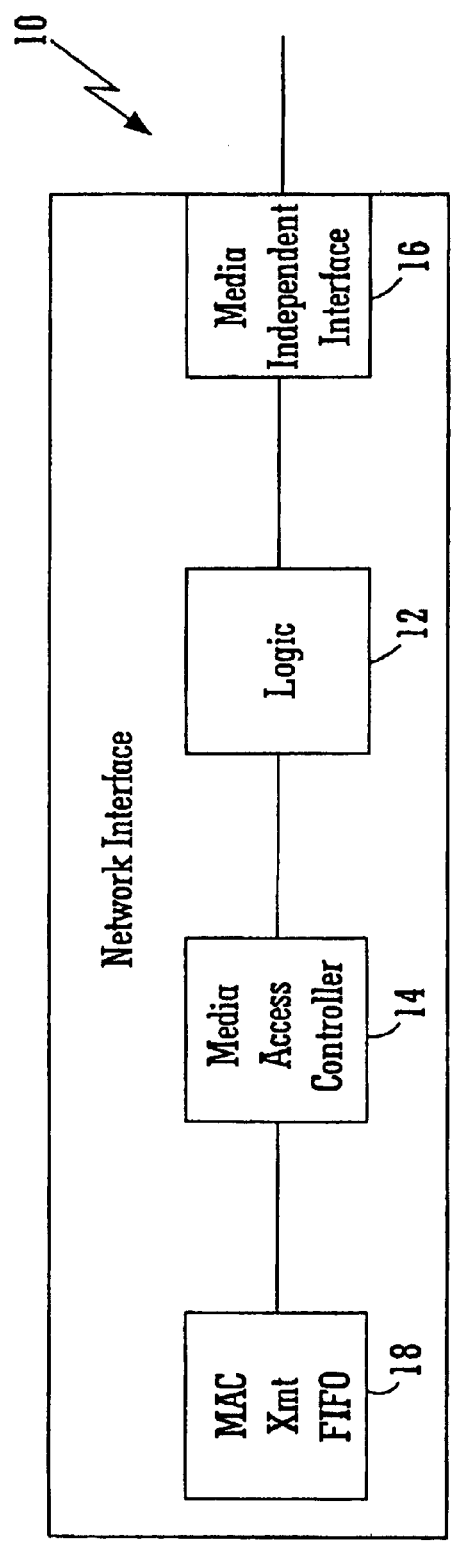
FIG. 1 is an example of a media access controller that does not account for link latency or delays caused by logic that is external to the media access controller.
Figure 2:
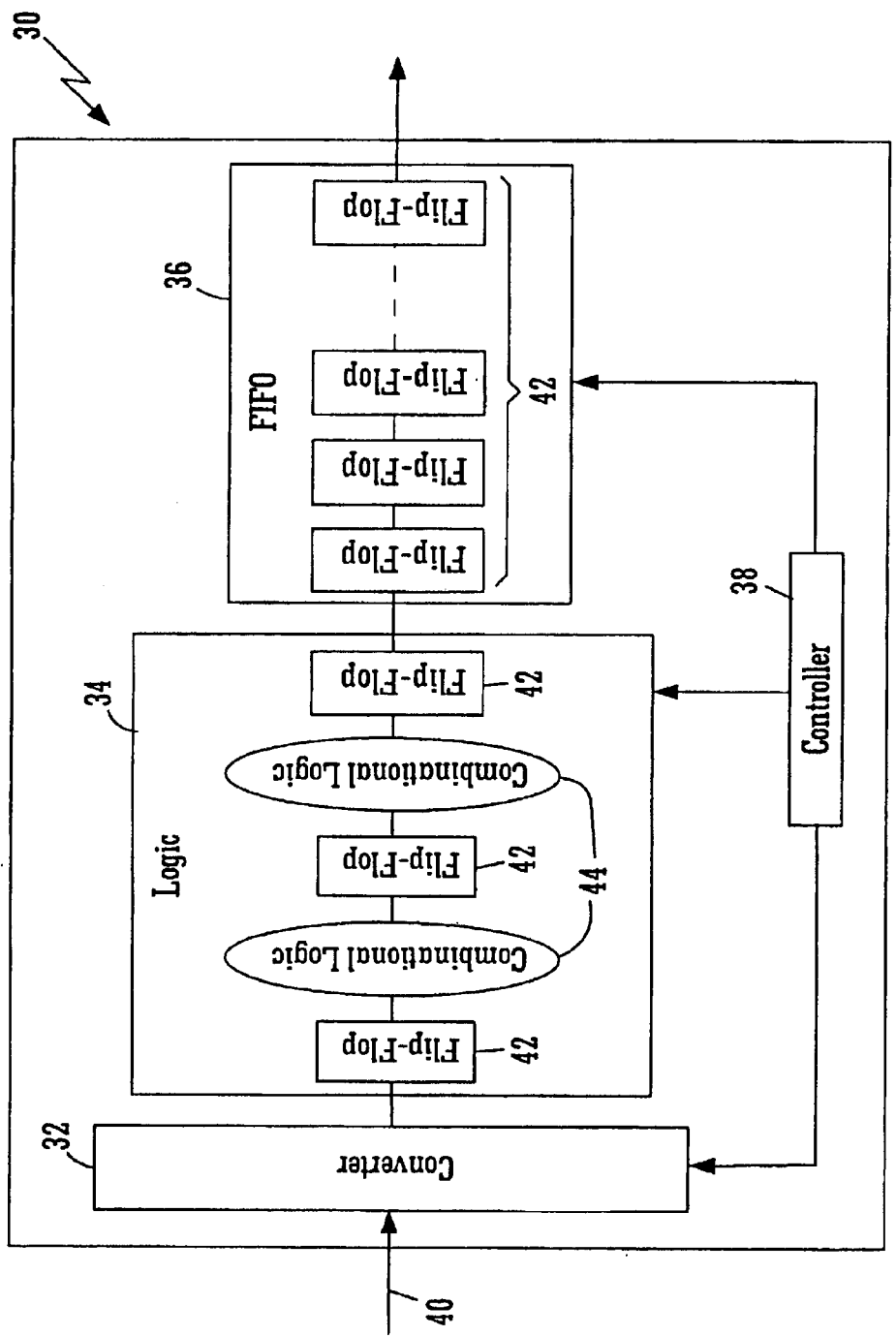
FIG. 2 is a block diagram of a media access controller that accounts for link latency or delays caused by logic in the media access controller modifying at least a portion of a data packet according to one embodiment of the present invention.

FIG. 2 is an example of a media access controller that accounts for link latency or delays caused by logic in the media access controller modifying at least a portion of a data packet according to one embodiment of the present invention. As illustrated, a media access controller 30 receives frame data from a network station. Specifically, the frame data is received over a data bus 40 from a transmit buffer (not shown) which is connected to a high speed bus interface unit (not shown). A converter 32 in the media access controller 30 converts the frame data into a prescribed format, i.e., Ethernet 802.3 format, for transmission onto a network medium. For example, a 32 to 4 converter converts 32 bit wide data down to 4 bit wide data. A portion of a data packet can be modified by logic 34. In the preferred embodiment of the invention, logic 34 comprises combinational logic 44 which modifies a data packet and flip-flops 42 which are used to buffer the data packet prior to and after the data packet is modified. The modifications to the data packet can occur using various modification schemes. For example, in one embodiment, the modification comprises incorporating cyclic redundancy check (CRC) digits with the data packet. In another embodiment, the modification includes encrypting the data packet. In yet another embodiment, the modification includes attaching additional routing tags to the data packet. In certain embodiments, the modification is a plurality of these different schemes.

The modified data packet is sent to a FIFO 36, which buffers the modified data packet prior to being transmitted onto a network by a media independent interface (not shown). The FIFO 36 has a plurality of flip-flops 42 are used to buffer the data packet.

The media access controller 30 is able to account for any delays caused by the logic 34 modifying the data packet. If the network operates according to a prescribed transmission sequence, the media access controller 30 is able to account for any delays and transmit the converted data at the proper time in accordance with the prescribed sequence without causing any additional congestion problems.

Specifically, the controller 38 in the media access controller 30 is employed to account for any delays caused by the logic 34. Since the controller 38 controls the flow of the data through the media access controller 30, as well as the timing of the transmission of the data packet out of the media access controller 30, the controller 38 can properly account for any delays caused by the logic 34.

In an alternate embodiment, the FIFO 36 can buffer the data packet prior to the logic 34 modifying the data packet.

Figure 3:
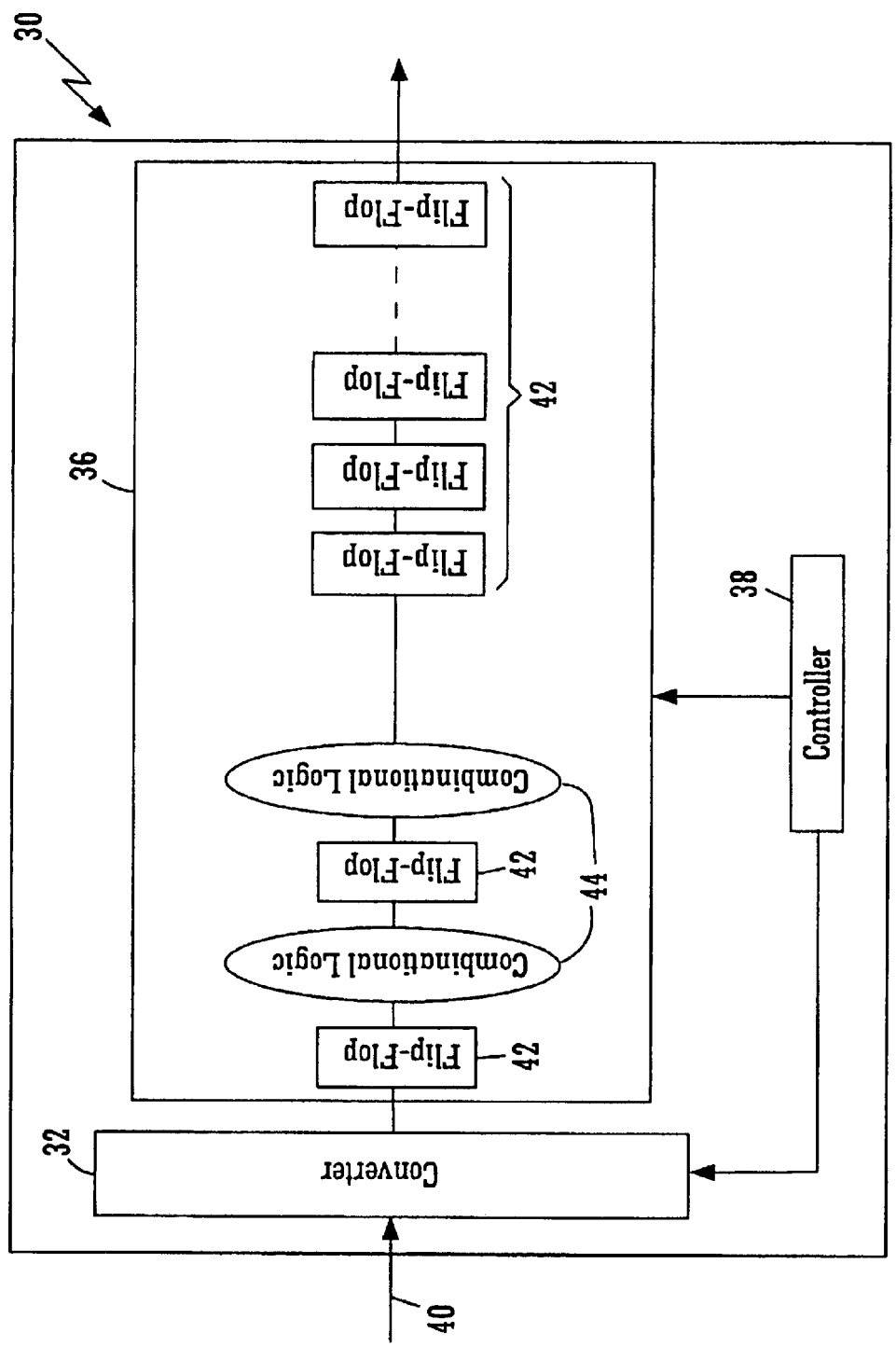
FIG. 3 is a block diagram of a media access controller that accounts for link latency or delays caused by logic in the media access, controller modifying at least a portion of a data packet according to another embodiment of the present invention, where the logic and FIFO are combined.

FIG. 3 is a block diagram of a media access controller that accounts for link latency or delays caused by logic in the media access controller modifying at least a portion of a data packet according to another embodiment of the present invention, where the logic and FIFO are combined. Since the logic 34 and the FIFO 36, of FIG. 2, include flip-flops 42 for buffering the data packet, the logic 34 is incorporated into the FIFO 36, thereby eliminating the need to provide the flip-flop 42 that was provided in the logic 34 (FIG. 2) for buffering the data packet after the data packet is modified. More specifically, by combining the logic 34 into the FIFO 36, the initial flip-flop of the FIFO portion of FIFO 36 will provide buffering the data packet after the data packet is modified by the logic portion of FIFO 36, thereby reducing the number of flip-flops 42 that are needed to buffer the data.

Figure 4:
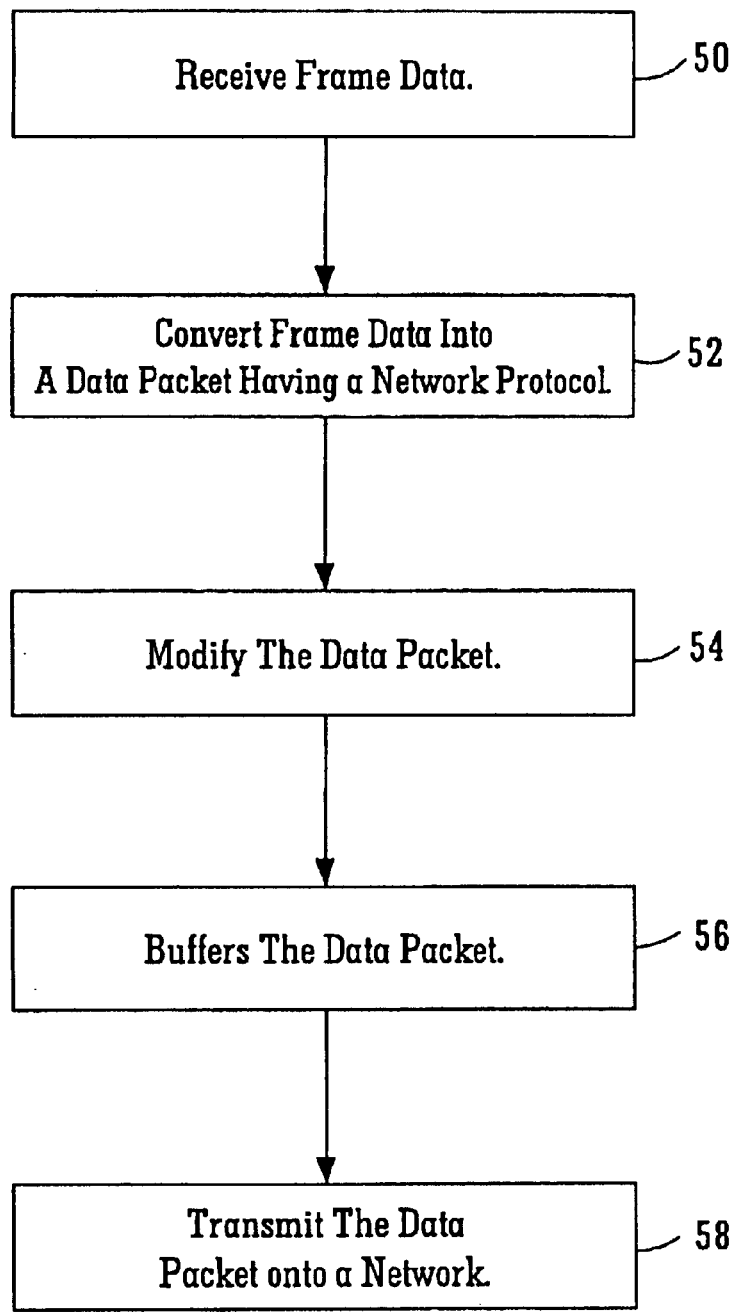
FIG. 4 is an example of a method for a media access controller accounting for delays caused by logic in the media access controller modifying at least a portion of a data packet according to the present invention.

FIG. 4 is an example of a method for a media access controller accounting for delays caused by logic in the media access controller modifying at least a portion of a data packet according to the present invention. A converter 32 receives frame data from a transmit buffer in step 50. The converter 32 converts the frame data into a data packet having a prescribed format for transmission onto a network at step 52. The conversion can include converting the size of the data. Logic 34 modifies at least a portion of the data packet at step 54. The modifications can include, as examples, incorporating cyclic redundancy check digits with the frame data, encrypting the frame data, appending routing information to the frame data, and other modifications to the frame data. A FIFO 36 buffers the data packet at step 56. The data packet is then transmitted by a media independent interface onto a network at step 58.

Figure 5:
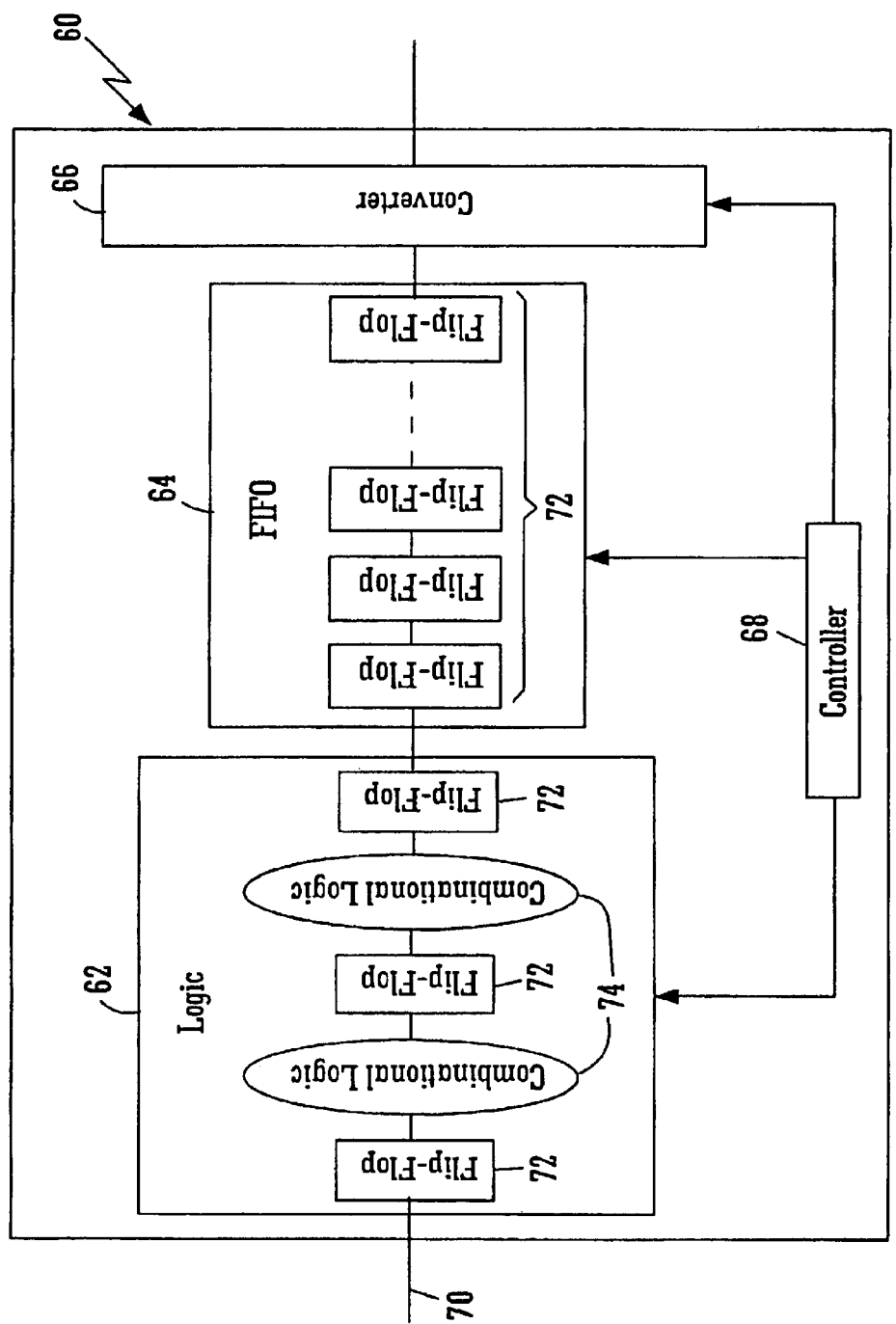
FIG. 5 is a block diagram of a media access controller that accounts for link latency or delays caused by logic in the media access controller modifying at least a portion of frame data according to one embodiment of the present invention.

FIG. 5 is a block diagram of a media access controller that accounts for link latency or delays caused by logic in the media access controller modifying at least a portion of frame data according to one embodiment of the present invention. As illustrated, a media access controller 60 receives frame data. The frame data is received over a data bus 70 from a transmit buffer (not shown) which is connected to a peripheral component interface (PCI) bus interface unit (not shown). The frame data is received by logic 62 inside the media access controller 60. The frame data can be modified by logic 62. Logic 62 consists of combinational logic 74 that modifies the frame data and flip-flops 72 that are used to buffer the frame data prior to and after the frame data is modified.

The modifications to the frame data can occur using various modification schemes. For example, in one embodiment, the modification consists of incorporating cyclic redundancy check (CRC) digits with the frame data. In another embodiment, the modification consists of encrypting the frame data. In yet another embodiment, the modification consists of attaching additional routing tags to the frame data.

The frame data is sent to a FIFO 64, which buffers the frame data. The FIFO 64 consists of a plurality of flip-flops 72, which are used to buffer the frame data. Next, a converter 66 in the media access controller 60 converts the frame data into a data packet having a prescribed format, i.e., Ethernet 802.3 format, for transmission. For example, a 32 to 4 converter 66 converts 32 bit wide data down to 4 bit wide data. The data packet is then transmitted onto a network by a media independent interface (not shown).

In addition, the media access controller 60 is able to account for any delays caused by the logic 62 modifying the data packet. If the network operates according to a prescribed transmission sequence, the media access controller 60 is able to account for any delays and transmit the converted data at the proper time without causing any additional congestion problems.

Specifically, the controller 68 in the media access controller 60 is able to account for any delays caused by the logic 62. Since the controller 68 controls the flow of the data through the media access controller 60, as well as the timing of the transmission of the data packet out of the media access controller 60, the controller 68 can account for any delays caused by the logic 62.

In an alternate embodiment, the frame data is buffered in the FIFO 64 prior to being modified by the logic 62.

Figure 6:
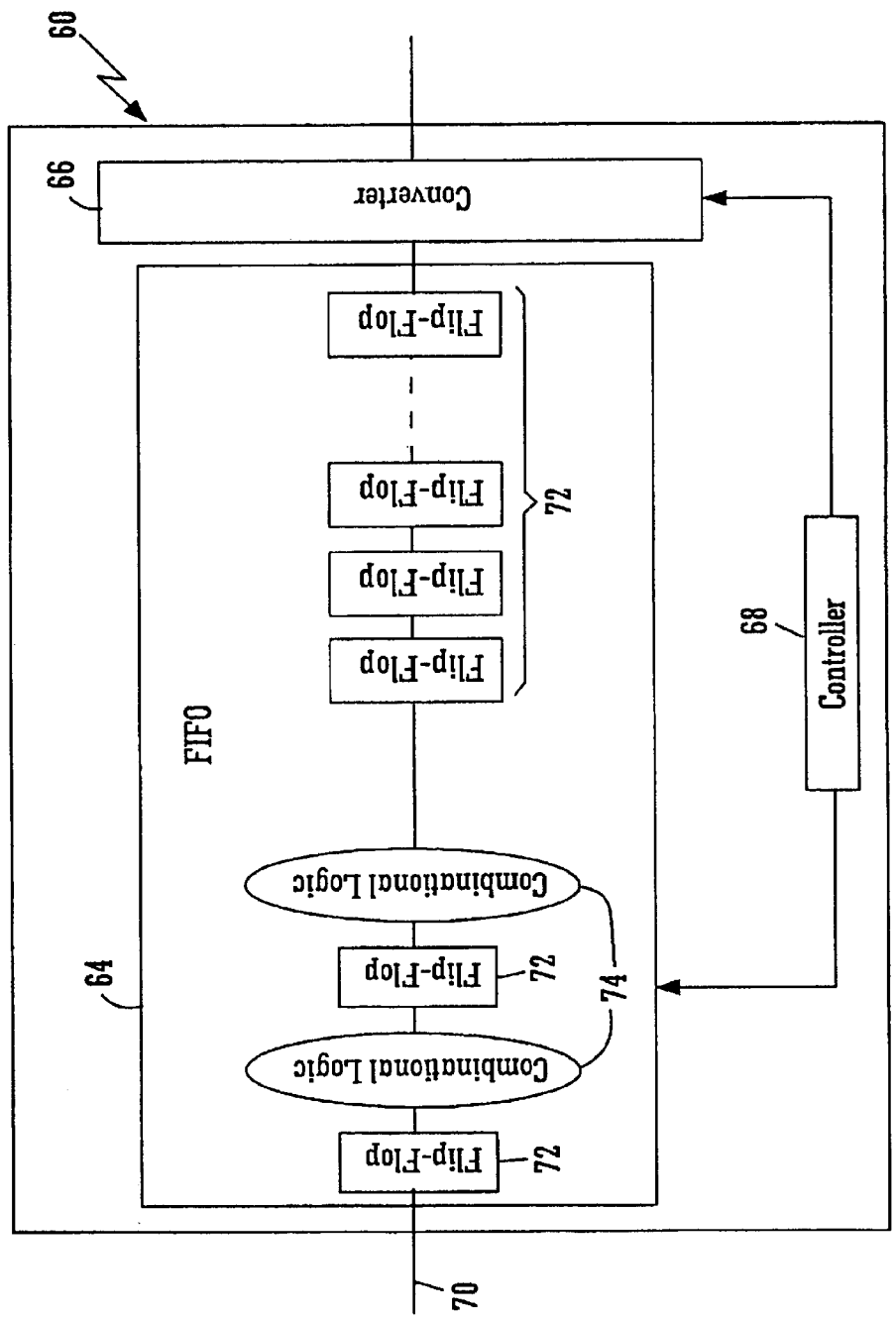
FIG. 6 is a block diagram of a media access controller that accounts for link latency or delays caused by logic in the media access controller modifying at least a portion of frame data according to another embodiment of the present invention, where the logic and FIFO are combined.

FIG. 6 is a block diagram of a media access controller that accounts for link latency or delays caused logic in the media access controller modifying at least a portion of frame data according to another embodiment of the present invention, where the logic and FIFO are combined. Since the logic 62 and the FIFO 64, of FIG. 5, include flip-flops 72 for buffering the data packet, the logic is incorporated into the FIFO 64, thereby reducing the number of flip-flops 72 that are needed to buffer the data.

Figure 7:
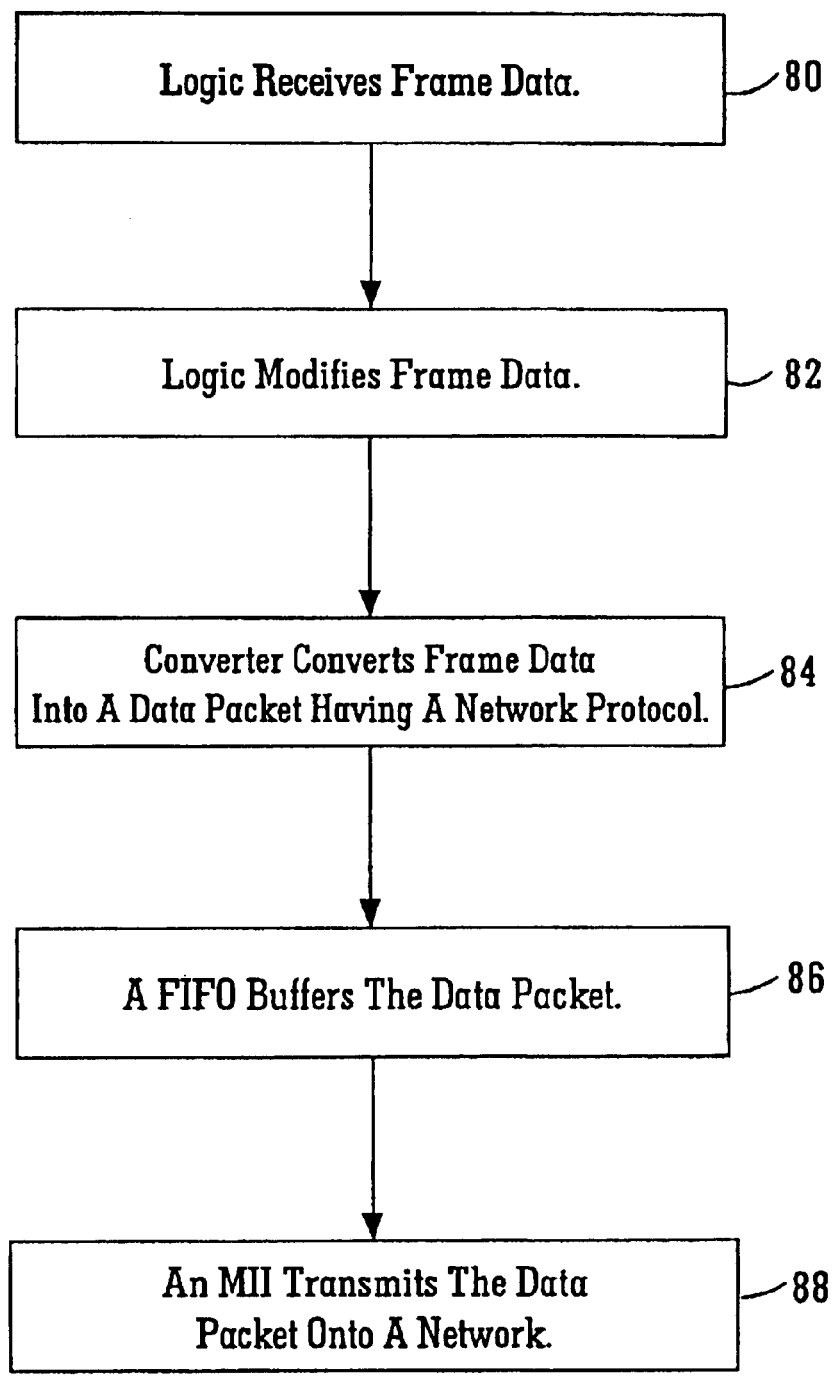
FIG. 7 is an example of a method for a media access controller accounting for delays caused by logic in the media access controller modifying at least a portion of frame data according to the present invention.

FIG. 7 is an example of a method for a media access controller accounting for delays caused by logic in the media access controller modifying at least a portion of frame data according to the present invention. The logic 62 receives frame data from a transmit buffer in step 80. The received frame data is modified by the logic 62 in step 82. The modifications can include incorporating cyclic redundancy check digits with the frame data, encrypting the frame data, appending routing information to the frame data, and similar modifications to the frame data.

The converter 66 receives the modified frame data and converts the modified frame data into a data packet having a prescribed network protocol in step 84. The conversion can include converting the size of the data. The data packet is buffered by the FIFO 64 in step 86. The media access controller 60 then transmits the converted data packet from the media access controller 60 onto a network transmits via a media independent interface in step 88.

By modifying frame data or data packet inside the media access controller rather than after the media access controller, the controller inside the media access controller is able to account for any link latency or delays caused by the logic. By internally accounting for the delays, the controller is able to control when the data packets are sent. Therefore, the media access controller of the present invention is able to reduce collisions by waiting a proper amount of time between transmissions and not encounter a collision with a collision signal. In addition, the media access controller of the present invention is able to react to a collision signal without causing additional collisions by waiting the proper amount of time before re-transmitting.

While this invention has been described in connection with what is presently considered to be the most practical and preferred embodiments, it is to be understood that the invention is not limited to the disclosed embodiments, but, on the contrary, is intended to cover various modifications and equivalent arrangements included within the scope of the appended claims.

We claim:

1. A media access controller in a network interface comprising:

a converter configured for receiving frame data from a transmit buffer and converting the frame data into a data packet having a prescribed format for transmission onto a network;

logic configured for modifying at least a portion of the data packet; and a first in first out (FIFO) memory configured for buffering the data packet for transmission onto a network, wherein the FIFO buffers the data packet using a plurality of flip-flops.

2. The media access controller of claim 1, wherein the prescribed format for transmission is Ethernet 802.3 format.

3. The media access controller of claim 1, wherein the logic is configured for modifying at least a portion of the data packet by adding cyclic redundancy check digits to the data packet.

4. The media access controller of claim 1, wherein the logic is configured for modifying at least a portion of the data packet by encrypting the data packet.

5. The media access controller of claim 1, wherein the logic is configured for modifying at least a portion of the frame data by attaching packet routing information to the data packet.

6. The media access controller of claim 1, wherein the logic further comprises at least one flip-flop for buffering purposes.

7. The media access controller of claim 6, wherein the logic is incorporated into the FIFO, thereby reducing the number of flip-flops.

8. The media access controller of claim 1, wherein the media access controller transmits the data packet to a media independent interface for transmission onto a network.

9. The media access controller of claim 1, further comprising a controller for controlling the flow of data within the media access controller.

10. A media access controller in a network interface comprising:
    logic configured for receiving frame data from a transmit buffer and modifying at least a portion of the frame data;
    a first in first out (FIFO) memory configured for buffering the frame data received from the transmit buffer using a plurality of flip-flops; and
    a converter configured for receiving the frame data from the FIFO and converting the frame data into a data packet having a prescribed format for transmission onto a network.

11. The media access controller of claim 10, wherein the prescribed format for transmission is Ethernet 802.3 format.

12. The media access controller of claim 10, wherein the logic is configured for modifying at least a portion of the frame data by adding cyclic redundancy check digits to the frame data.

13. The media access controller of claim 10, wherein the logic is configured for modifying at least a portion of the frame data by at least a portion of the data packet by encrypting the frame data.

14. The media access controller of claim 10, wherein the logic is configured for modifying at least a portion of the frame data by attaching packet routing information to the frame data.

15. The media access controller of claim 10, wherein the logic further comprises at least one flip-flop for buffering purposes.

16. The media access controller of claim 15, wherein the logic is incorporated into the FIFO, thereby reducing the number of flip-flops.

17. The media access controller of claim 10, wherein the media access controller transmits the data packet to a media independent interface for transmission onto a network.

18. The media access controller of claim 10, further comprising a controller for controlling the flow of data within the media access controller.

19. A method for accounting for delays in a media access controller, comprising:
    receiving a frame data from a transmit buffer;
    converting the frame data received from the transmit buffer into a data packet having a prescribed format for transmission;
    modifying at least a portion of the converted data packet; and
    buffering the modified data packet; and
    transmitting the modified and buffered data packet onto a network.

20. The method as in claim 19, wherein the modifying at least a portion of the data packet further comprises appending a cyclic redundancy check to the data packet.

21. The method as in claim 19, wherein the modifying at least a portion of the data packet further comprises encrypting the data packet.

22. The method as in claim 19, wherein the modifying at least a portion of the data packet further comprises appending packet routing information to the data packet.

23. A method for accounting for delays in a media access controller, comprising:
    receiving a frame data from a transmit buffer;
    modifying at least a portion of the frame data received from the transmit buffer;
    buffering the modified frame data;
    converting the frame data into a data packet having a prescribed format for transmission; and
    transmitting the converted frame data packet onto a network.

24. The method as in claim 23, wherein the modifying at least a portion of the frame data further comprises appending a cyclic redundancy check to the frame data.

25. The method as in claim 23, wherein the modifying at least a portion of the frame data further comprises encrypting the frame data.

26. The method as in claim 23, wherein the modifying at least a portion of the frame data further comprises appending packet routing information to the frame data.

* * * * *